(12) United States Patent
Howsam (10) Patent No.: US 6,635,301 B1
(45) Date of Patent: Oct. 21, 2003

(54) METHOD AND APPARATUS FOR THE MANUFACTURE OF MEAT

(75) Inventor: Stuart Howsam, Wodonga (AU)

(73) Assignee: Mars, Incorporated, McLean, VA (US)

(*) Notice: Subject to any disclaimer, the term of this patent is extended or adjusted under 35 U.S.C. 154(b) by 0 days.

(21) Appl. No.: 10/009,432

(22) PCT Filed: May 18, 2000

(86) PCT No.: PCT/AU00/00475

§ 371 (c)(1),
(2), (4) Date: Apr. 8, 2002

(87) PCT Pub. No.: WO00/69276

PCT Pub. Date: Nov. 23, 2000

(30) Foreign Application Priority Data

May 18, 1999 (AU) .............................. PQ 0440

(51) Int. Cl.[7] .............................. A23J 3/26; B02C 18/14
(52) U.S. Cl. .................... 426/574; 426/634; 426/656; 426/578; 426/614; 426/516; 241/189.1; 241/154
(58) Field of Search ................. 426/634, 656, 426/574, 578, 614, 516; 241/189.1, 154

(56) References Cited

U.S. PATENT DOCUMENTS

| | | | |
|---|---|---|---|
| 4,185,123 A | * | 1/1980 | Wenger et al. |
| 4,196,222 A | | 4/1980 | Cheney |
| 4,537,783 A | * | 8/1985 | Liepa |
| 5,034,232 A | | 7/1991 | Sugitani et al. |
| 5,188,302 A | | 2/1993 | Alvarez |
| 5,922,392 A | * | 7/1999 | Kelly et al. |

FOREIGN PATENT DOCUMENTS

| | | |
|---|---|---|
| AU | 64388/74 | 7/1975 |
| AU | 12899/88 | 9/1988 |
| EP | 0 512 146 B1 | 11/1992 |
| GB | IB-96/36242 | 11/1996 |

* cited by examiner

Primary Examiner—Anthony J. Weier
(74) Attorney, Agent, or Firm—Fulbright & Jaworski L.L.P.

(57) ABSTRACT

A method of manufacturing a texturised proteinaceous meat analogue product, including: subjecting, in a food extruder a mixture containing: about 40 to 95% by weight edible proteinaceous materials selected from the group of predetermined mixtures of defatted soy flour, soy meal, soy concentrate, cereal gluten in vital or starch-containing form and egg white, and up to about 7% by weight of edible mineral binding and cross-linking compounds; to mechanical pressure and added heat sufficient to convert the mixture into a hot, viscous protein lava; extruding the protein lava through and from a temperature controlled cooling die which cools and reduces the viscosity of the protein lava to obtain a cohesive, texturised, extrudate slab or ribbon in which vapour-flashing is substantially inhibited; and subjecting the solidified extrudate slab or ribbon to mechanical shredding in a hammer mill having a cage plate with a plurality of elongate discharge openings and a plurality of hammer bars hinged to discs attached to a rotating shaft, so as to obtain a plurality of extrudate shred that resemble in consistency and texture flaked or shredded meat.

22 Claims, 4 Drawing Sheets

METHOD AND APPARATUS FOR THE MANUFACTURE OF MEAT

FIELD OF THE INVENTION

The present invention broadly relates to the manufacture of edible proteinaceous products, in particular texturised protein products (TPPs) for human and/or animal consumption. In particular, the invention relates to a method and apparatus for the manufacture of fibrous meat analogue products using cooking-extrusion technology, as well as to a meat analogue product obtained by such method and apparatus.

BACKGROUND AND PRIOR ART TO THE INVENTION

The industrial manufacture of meat analogue products from protein-rich precursor materials, including plant based precursors such as cereal grain gluten (of wheat, rice, or maize; vital or with residual starch), defatted oil seed, cereal and bean flours, meals and derivatives (e.g. defatted soy flour, soy protein concentrates, wheat flour), or animal based precursors such as meat by-products obtained by mechanical separation, fish meal, dried egg white and others, alone or in combination, is nowadays well established practice. Cooking-extrusion technology is by far the most widely used one of different possible manufacturing methods to obtain such meat analogues.

The texture of such products (hereinafter also simply referred to as texturised protein products (or TPPs), whether based solely on grain or bean sourced proteins or having additional, meat-based precursors) is an especially important criteria if such product is to be used as a replacement for real meat products, as acceptance of the product, in particular if intended for human consumption, will depend on its capability to simulate existing meat as far as bite, chewiness, structure, appearance (and taste) are concerned. Whilst appearance may not seem as important where the analogue product is to be used in pet foods, either alone or mingled with real meat pieces and embedded in semi-liquid carriers (eg gravy), its structure and texture are still important factors, as these determine the suitability of the analogue product for further processing after its manufacture. For instance, the structure and texture may determine whether the analogue product may be suitable to be subjected to certain steps to obtain the end product (e.g. in retorted or hydrated form, such as in canned pet food products).

In its very basic form, manufacture of meat analogue products with a textured or fibrous structure entails the commingling of the weighted dry precursors and introducing these together with water (to obtain a desired moisture content in the mixture) into a suitable heated extruder (e.g. single or double screw extruder). Whilst passing through the extruder, which has discrete sections to perform specific mechanical operations on the mixture, the mixture is plasticised and heated to form a hot, viscous and at least partly molten mass, often referred to as a protein lava. The properties of the viscous mass at the end of the thermomechanical conversion process, which the precursors undergo within the extruder barrel, are dependent on the process variables (e.g. temperature in the different sections of the extruder barrel, screw speed/barrel section pressure, moisture content, precursor formulation, etc.). In order to achieve the formation of fibrous structures in the extrudate, the hot, viscous mass of proteinaceous material is pressed by the extruder screw(s) through a breaker plate having a multitude of small openings and subsequently passed through a cooling or tempering die flanged at the extruder barrel outlet opening. The cooling die is used to prevent or regulate flashing of the moisture contained in the extrudate, so as to obtain a plastically-malleable, but otherwise cohesive, non-puffed extrudate in the form of a continuous slab or ribbon of "meat analogue" product (c.f. "Better Texture for Vegetable Protein Foods", Food Engineering International Journal, September 1976).

Extrudates prepared from defatted soy flour with moderate water content (up to 35%) using single-screw, temperature controlled extruders are slightly expanded (or puffed), easily dried, and (only to a certain extent) have structure and texture features resembling animal muscle tissue. However, it is inappropriate to call them meat analogues, as they have to be rehydrated with water and/or flavoured liquids before consumption.

High moisture extrusion-cooking and texturisation (or protein fibration) is one food technology process that has been successfully employed in recent years in fibrating protein-based formulations at high moisture content, and thus texturising "wet", meat-like TPPs either using solely plant protein sources (cereal and oil-seed grain protein sources such as soya flour, soy protein concentrate and vital wheat gluten, in particular) and/or animal proteins such as fish flour, egg white powder, fresh meat by-products and the like. HMEC process technology, which is particularly advantageous in the context of the present invention, is described in more detail in "Extrusion cooking of high moisture protein foods", by Akinori Noguchi in: Mercier, C., Linko, P., Harper, J. M. (ed.), *Extrusion Cooking*, 343–370, American Association of Cereal Chemists, St Paul, Minnesota, the contents of which, including that of the references cited there, are incorporated herein by way of short-hand cross reference. Further details on this technology are also described in "High moisture extrusion cooking and protein fibration", by D. Durand, J. M Bouvier and S. Le Royer, being a paper presented during the Third Annual Smart Extrusion Seminar 1998, hosted by Food Science Australia, which was held on Aug. 31 and Sep. 1, 1998, and the references cited in that paper.

Importantly, the TPP slab or ribbon extrudate, after exiting the extruder, is generally subjected to further process steps in order to obtain the desired end product. So it is known to have specially designed forming dies at or within the cooling die and cutting devices to impart a specific shape on the extrudate to mimic actual animal or vegetable products such as seafood, chicken slices, beef chunks or slices, sausages, mushroom caps and the like. As indicated above, if the TPP extrudate is to be used in the manufacture of pet foods, for example, it is important that it can be appropriately portioned (e.g. into chunks, slices, etc.) and retain its texture and structural integrity during subsequent production steps which may include freezing, co-mingling as a meat extender with real meat (or meat by-products), filling into cans with aqueous liquids, thermal treatment, rehydration and/or retorting in case the moisture content of the TPP after extrusion is below desired values, and the like, which can adversely affect the fibrous structure of the TPP.

It is further known that the inherent aptness of a TPP extrudate to be subjected to further forming steps not only depends on the process parameters selected during extrusion in the screw-extruder and cooling in the forming die, but also the composition of the precursor mixture and water content. For example, inadequate dwell time or cooling of the extrudate within the flash expansion inhibiting cooling die may lead to a puffy consistency and texture of the TPP extrudate, which will negatively increase moisture absorption during subsequent manufacturing steps, and may render the finished product of mushy consistency, and not meat-like at all (compare for example U.S. Pat. No. 3,968,268 (Sair et al.)).

Similarly, formulation of the TPP (i.e. use of different protein-source precursors and relative proportions thereof in precursor mixtures), as well as presence of nutritional additives, flavouring and conservation agents, initial moisture contents and the like, affect the inner structure and texture of the extrudate and therefore its susceptibility to mimic specific types of meat. In other words, not all formulations will be useful where the end product to be mimicked is chicken meat or tuna flakes, and mixtures and formulations can only be exchanged to a certain extent for the same end product to be mimicked.

The present invention, in one of its aspects, aims at providing a method of manufacturing a texturised protein (i.e. analogue) product that mimics the appearance of flaked fish meat (in particular tuna fish flakes), shredded chicken meat or other meat products, as well as an apparatus for manufacturing such texturised protein (i.e. analogue) product.

The invention also seeks to provide a suitable formulation for a texturised protein (i.e. analogue) product that enables the TPP extrudate formed in an extrusion cooking process, in particular high moisture extrusion cooking, to be mechanically shredded into flakes that closely resemble in texture and structure a meat product, such as flaked fish meat (in particular coarsely flaked tuna fish) or shredded chicken meat (e.g. chicken breast meat).

SUMMARY OF THE INVENTION

Accordingly, in a first aspect of the present invention, there is provided a method of manufacturing a texturised proteinaceous meat analogue product, said method including:

subjecting, in a food-extruder, a mixture containing:
about 40 to 95% by weight edible proteinaceous materials selected from the group consisting of predetermined mixtures of defatted soy flour, soy meal, soy concentrate, cereal gluten in vital or starch-containing form and egg white; and
up to about 7% by weight of edible mineral binding and cross-linking compounds;
to mechanical pressure and added heat sufficient to convert the mixture into a hot, viscous protein lava;
extruding the protein lava through and from a temperature controlled cooling die which cools and reduces the viscosity of the protein lava to obtain a cohesive, texturised, extrudate slab or ribbon in which vapour-flashing is substantially inhibited; and
subjecting the solidified extrudate slab or ribbon to mechanical shredding in a hammer mill having a cage plate with a plurality of elongate discharge openings and a plurality of hammer bars hinged to discs attached to a rotating shaft, so as to obtain a plurality of extrudate shreds that resemble in consistency and texture flaked or shredded meat.

Preferably, the extrudate shreds resemble in consistency and texture flaked fish meat, shredded chicken meat or shredded red meat (such as beef or lamb).

Preferably, the above method includes the addition of some real meat product or meat by-product. This addition may occur prior to, during or after the step of subjecting the mixture to mechanical pressure and heat. Preferably, the addition of the meat product or meat by-product occurs during the extrusion step. This real meat or meat by product may be obtained from fish, poultry or from livestock (such as cattle or sheep).

Advantageously, the extrudate is transferred directly after leaving the cooling die to the hammer mill for shredding, as optimum shredding to obtain extrudate shreds or flakes is achieved whilst the extrudate slab is still warm. Therefore, typically, the time between extrusion and cutting should not exceed 5 minutes.

Preferably, the mixture referred to above has a total moisture content of between about 40 and about 60%. However, during the manufacturing process, moisture is lost especially after the extrudate slab or ribbon exits the cooling die. Therefore, since the preferred moisture content of the extrudate slab or ribbon is between about 40 to 60% water is generally added as some point(s) in the process.

Preferably, tempered water is sprayed onto the extrudate slab after it exits the cooling die and whilst being conveyed towards the hammer mill. This step increases densification of the solidified extrudate and has a positive effect on the actual shredding operation. However, tempering should be moderate, as warm cutting of the extrudate slab renders a better end product than shredding a fully cooled slab.

It will be understood that the extrudate can be conveyed as a continuous band or ribbon directly into the hammer mill, or it may be conveyed in shorter lengths or discontinuous portions.

A preferred formulation in the manufacture of the extrudate shreds includes, (in % by weight of materials that make up the mixture before addition of water), about 40–55% detatted soy flour, soy meal or soy concentrate, about 35–45% vital wheat gluten, egg white powder, a mixture of vital wheat gluten and maize gluten or a mixture of vital wheat gluten and wheat flour, 0.1–7.0% of non-leaching mineral compound(s) that bind in the protein matrix and enhance protein cross-linking (including for example 0.08 to 0.3% sulphur), optionally 0–5% nutritional fiber additives, in particular cellulose or beet pulp, 0.1–0.3% vitamins, 0–3.0% flavouring agents and 0.01–3.0% colouring agents. The moisture content of such a dry ingredients mixture is typically within a range of 6–15% by weight, and water in an appropriate amount is added to the dry mixture itself or into the extruder at a point downstream of the feeding entry for the dry material mixture so as to obtain a total moisture content of the extrudate within a range of 35 to 60%.

A particularly preferred formulation, which results in extrudate shreds that substantially mimic tuna fish flakes and which can be further processed together with real fish chunks and gravy into a fish-based, canned pet food product, consists of a dry ingredient mixture of about 51.5% defatted soy flour, about 42% vital wheat gluten, 5% dicalcium phosphate, 0.1% sulphur, 0.18% nutritional vitamin supplements, 0.2% nutritional mineral supplements, 1.0% flavouring agents and 0.002% colouring agents (all weight %), water being added to the mixture before or after being metered into the extruder in an amount to obtain an extrudate overall moisture content by weight of about 48–52%.

In accordance with the invention, it has been unexpectedly found that a conventional hammer mill, which is generally employed to grind, particulate or pulverise dry, soft materials such as coal, grains, seeds and similar dry materials, can be employed to shred the proteinaceous, plasto-elastically-resilient, and moisture-rich extrudate slab or ribbon into chunks or pieces that closely resemble in appearance those of shredded tuna fish meat or chicken meat, without otherwise adversely affecting the structure and texturisation of the TPP shreds.

The hammer mill requires for this purpose modification of the shape of the generally circular cage plate openings into suitable shapes, such as oblong slits or rectangular holes. Conventionally, intermeshing rotatable knife blades would have been the expected choice for shredding the extrudate. However, the resultant pieces lack the desirable flaky texture observed in many fish meats. Whilst no detailed analysis has been conducted on this, it is believed that the hammer bars interact with the slit-like openings in a manner so as to tear or rip the extrudate slab apart at interfaces between the fibres formed in the cooling die extrusion process, thereby imparting a shredded, flaky appearance as compared to clean cutting surfaces as obtained with rotary knifes.

The cage plate openings are preferably of uniform shape and area thereby to obtain extrudate shreds in which the individual shreds have a weight within a narrow range of possible weights, and have a randomly uniform appearance to the eye.

The process of this invention may include additional steps. For example, after the shredding operation, the extrudate shreds may undergo further processing which can include freezing, dehydration and canning.

In applications where the meat analogue extrudate shreds are to serve as meat extenders in canned pet food products, the extrudate shreds can be metered directly from the hammer mill into mixing vessels where the shreds may be commingled with appropriate real meat pieces (eg fish, chicken, lamb or beef pieces), gravy and nutritional additives. This may be desirable as the shelf life of the (uncanned) extrudate after shredding is relatively short, (eg 4 to 7 hrs), —the texture and structure of the untreated, moisture-rich shreds being stable for thermal and mechanical processing during that period. However, once further processed, for example in a canned product, the extrudate shreds maintain their body structure and appearance. Similarly, the dehydrated extrudate shreds can be hydrated using known processes without negatively affecting the structure and integrity of the rehydrated product.

In a second aspect of the present invention there is provided a shredded meat analogue product manufactured in accordance with the process described above using the formulation of materials referred to above.

In a third aspect of the present invention there is provided a production line for the manufacture of texturised proteinaceous meat analogue products, according to the method of the first aspect of the invention, including:

a food extruder with a plurality of temperature-controlled barrel sections and having at least one feed opening adapted for receiving the mixture of the first aspect of this invention, and a discharge opening adapted for discharging a hot, viscous protein lava;

a temperature-controlled cooling die located at the discharge opening and adapted for receiving the hot protein lava and for cooling the same to such an extent that an at least surface-solidified, proteinaceous extrudate slab or ribbon exits the cooling die substantially without vapour flashing taking place in the extrudate;

a hammer mill having a cage plate with a plurality of elongate discharge openings and a plurality of hammer bars hinged to discs attached to a rotating shaft; and conveyor means adapted to receive and convey the extrudate slab or ribbon from the cooling die to a feeding chute of the hammer mill.

Advantageously, a volumetric or mass flow dry material feeder is disposed in communication with the feed opening of the extruder, a separate means for metering water into the extruder being located at a point downstream of the dry material feeding opening. Water steam injection into the extruder barrels could also be used in known ways.

A water spraying unit is advantageously associated with the conveyor means, which preferably incorporates an endless conveyor rack, such as to direct fine sprays of tempered water on to the surface of the extrudate slab or ribbon as it travels on the conveyor rack toward the hammer mill chute, to effect additional densification of the surface of the extrudate slab or ribbon after it exits the cooling die.

The cooling die may be adapted so as to form the extrudate slab or ribbon having any suitable cross-section (e.g. rectangular or circular). The cooling die is preferably a multi-channel cooling die.

The production line is arranged such that continuous manufacturing of shredded TPP extrudate is achieved from metering of the dry ingredients and water into the extruder to metering the extrudate shreds into appropriate vessels for further processing. Alternatively, a further conveyor means can be disposed underneath the hammer mill discharge chute for conveying the meat analogue shreds towards further processing units of an integrated food production line, (e.g. a canning station or the like).

The extruder is preferably a twin conveyor and pressurising screw extruder with 4 to 8 barrel sections that are individually temperature controlled, each section having a length to diameter ratio of approximately 4, as used in high moisture extrusion cooking. Temperature settings at the individual barrel sections during the manufacturing process will vary between 60 and 120° C. and internal pressure between 3 and 8 MPa, at screw speeds of between 200 to 350 rpm.

Further features and advantages of the invention will be described in the following in relation to preferred embodiments thereof by way of example only and having reference to the accompanying drawings.

DETAILED DESCRIPTION OF PREFERRED EMBODIMENT OF THE INVENTION

Figure 1:
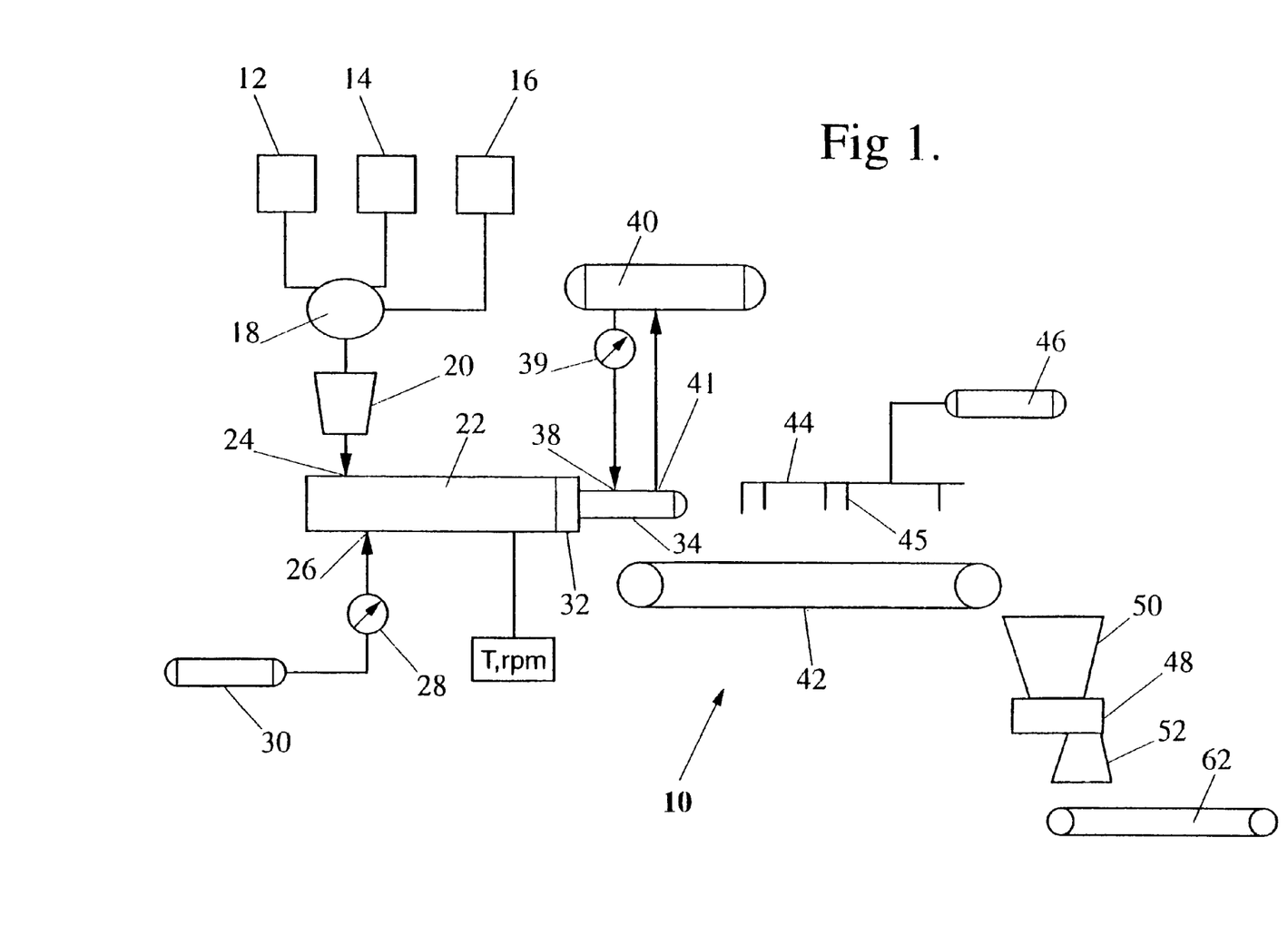
FIG. 1 shows in a block diagram a meat analogue (TPP) manufacturing line in accordance with one aspect of the present invention.

FIG. 1 illustrates in block representation a production/processing line 10 for the manufacture of shredded, fibrous meat analogue product in accordance with a preferred embodiment of the present invention. The process of manufacture and preferred formulations for the manufacture of the shredded texturised protein product in accordance with the invention will be described below. It is to be understood, however, that certain features and dimensions mentioned below can be varied to suit the scale of operation being conducted.

The line 10 includes storage vessels 12, 14, 16 for storing the dry precursor materials of the meat analogue product, which are metered in appropriate weight proportions and mixed using a conventional mixer 18 for particulate, free flowing and powdery materials, such as a ribbon blender. A twin-screw, heated extruder 22 suitable for high moisture extrusion cooking (HMEC) and protein fibration fitted with 4D 6 barrel sections (five identified in FIG. 2 by reference numerals 22a to 22e). Extruder 22 has an overall extruder length to diameter ratio of between 15 and 25 and is fitted at its inlet 24 with a volumetric or mass flow hopper 20 which receives the weighted dry materials mixture and meters this mixture into the first barrel section 22a of extruder 22. Extruder 22 is also equipped in known manner with means for controllably and individually heating and cooling the extruder barrel sections 22a–22e. The precise extruder configuration is not described here in detail, and reference should be had to "Extrusion cooking of high moisture protein foods", Akinori Noguchi, supra, and WO 96/36242 for a description of the constructional elements usually present in an extruder that is suitable for HMEC, as well as the usual operational parameters employed in HMEC.

Any suitable device 28 for metering water from a pure water source 30 into a separate liquid material injection port 26 of extruder 22 is also present.

A pump or mains pressure water may be used provided that the flow can be adjusted and kept constant. Water would normally be metered into extruder 22 at a point between 1D and 3D downstream of the dry material feed point 24, D being the diameter of the extruder barrel 22a. Direct steam injection into the extruder barrel may also be used at a different location, as exemplified at 26b in FIG. 2. A suitable extruder would be a Werner & Pfleiderer type C58 extruder with 5 barrel sections.

Figure 4:
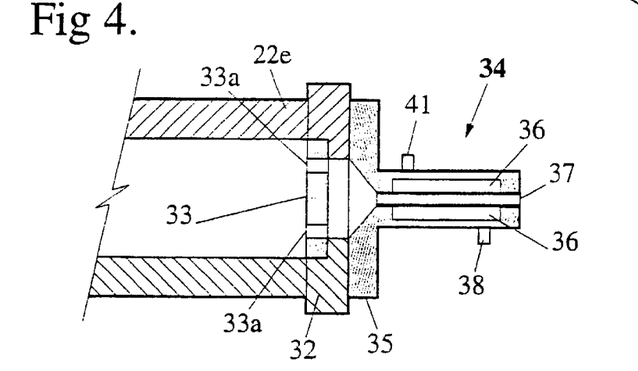
FIG. 4 is a schematic, longitudinal section of the discharge end of the extruder and the cooling die illustrated in block form in FIG. 1 and shown in FIG. 3.

Held within a mounting end plate 32 flanged to the delivery terminal end of extruder 22 is a 8 to 12 mm thick breaker plate 33, see FIG. 4, which is located 20 mm to 40 mm downstream of the final screw element of the extruder and which closes the cross-sectional area of the hollow interior of the last barrel section 22e in known manner. The breaker plate 33 has a plurality of bores 33a of same diameter, preferably 20 holes with a diameter of 3.5 to 4 mm, symmetrically disposed with respect to the centre axis of the extruder and equidistantly from one another.

A cooling die 34 is flanged with its transition plate 35, which has a forward tapering opening that is in communication with the downstream side of breaker plate 33, to the outside of endplate 32. Transition piece 35 supports cooling jackets 36 which surround an extrusion flow channel member 37 through which the extrudate mass exits the cooling die 34. Channel member 37 has advantageously a rectangular cross-section, typical dimensions being 50–80 mm width by 6 to 10 mm height and a length of 300 to 600 mm. This channel member 37 can be of any other shape (e.g. circular). Cooling jackets 36 provide in known manner cooling water channels for a cooling fluid, usually water, maintained at a temperature between 2 and 20° C., which is continuously pumped from reservoir 40 by means of pump 39 through inlet 38 into upper and lower cooling channels which are connected in parallel such that cooling fluid flow direction is counter-current to the extrudate flow direction, before exiting cooling die 34 through outlet 41.

Figure 3:
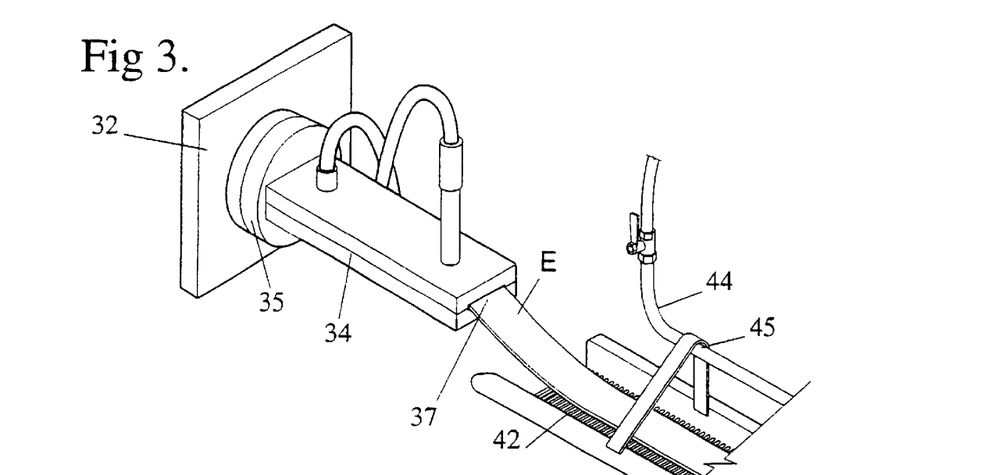
FIG. 3 is an isometric representation of the cooling die and the initial portion of the transport conveyor illustrated in block form in FIG. 1, the cooling die being flanged at the end plate of the extruder, and a TPP extrudate slab or ribbon exiting the cooling die and being conveyed on the conveyor belt.

As is best seen in FIG. 3, a continuous extrudate ribbon or slab with high surface to volume ratio is extruded through flow channel member 37. After the hot, viscous extrudate melt (or lava) leaves extruder 22 through breaker plate orifices 33a and whilst flowing through flow channel member 37, heat exchange is effected with the cooling fluid circulating within cooling die jacket 36.

A transport conveyor 42 having an endless grid belt is located immediately adjacent and below the terminal free end of cooling die 34 so as to receive thereon the continuous extrudate ribbon E and transport the same to a shredding device 48. As optimum shredding of the extrudate to obtain the desired end product is achieved when the solidified extrudate is warm, conveyor belt speeds and lengths should be chosen such that the time between extrusion and shredding should not exceed 5 minutes.

Returning to FIG. 1, a moisture spraying device consisting of a water supply line 44 with a plurality of discretely controllable spraying nozzles 45 located along the length of supply line 44 is arranged above transport conveyor 42. Water is supplied from a temperature controlled water supply 46 to the spraying nozzles at a temperature of 2° and 20° C. from where it is sprayed as a fine mist onto the extrudate slab to inhibit further firming of its exterior surface. It has been found that spraying the surface of the extrudate with tempering water improves the subsequent cutting/shredding operation.

Figure 5:
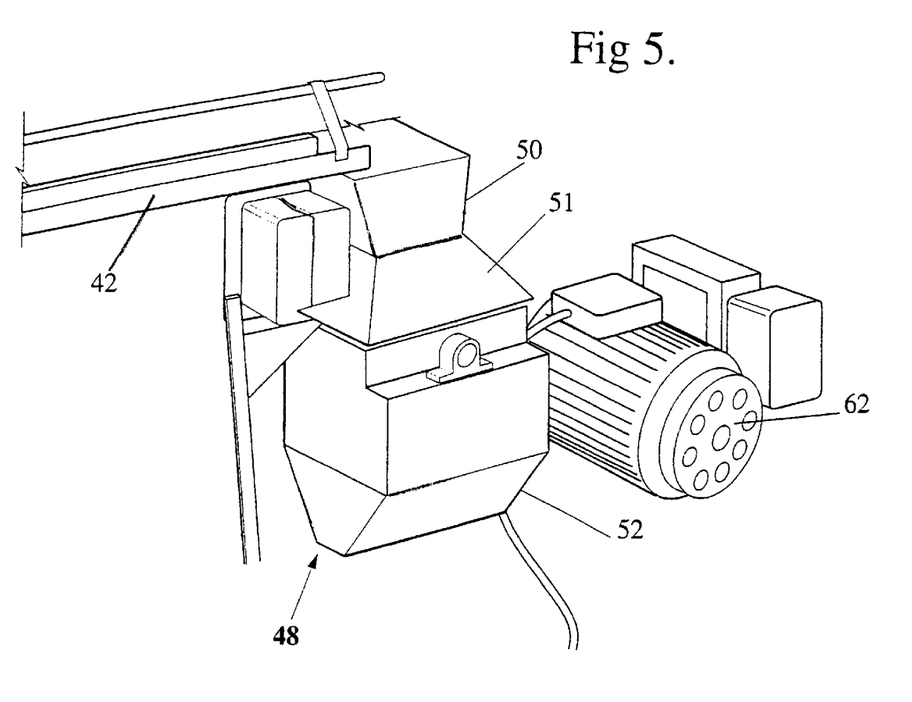
FIG. 5 is an isometric representation of the terminal section of the transport conveyor and the hammer mill illustrated in block form in FIG. 1.
Figure 6:
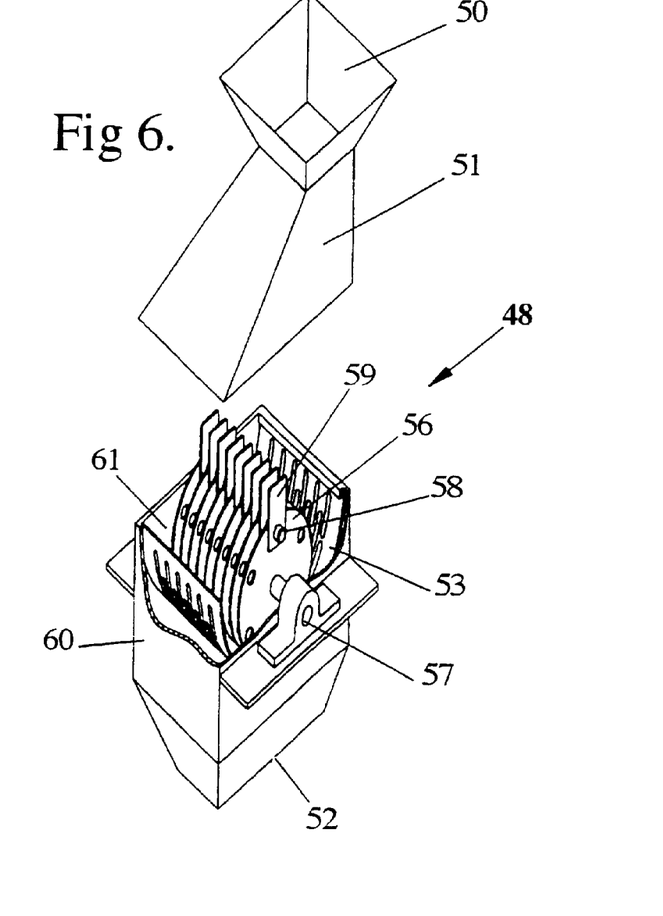
FIG. 6 is an expanded, isometric representation of the hammer mill illustrated in FIG. 5 and used to manufacture TPP extrudate shreds in accordance with the invention.
Figure 7:
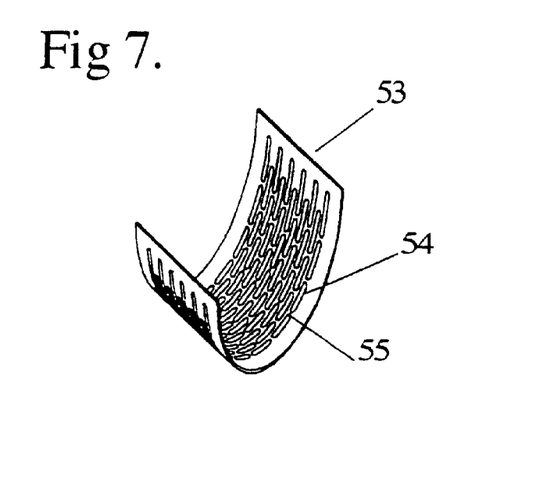
FIG. 7 is an isometric representation of the screen used in the hammer mill shown in FIG. 6.

The shredding device 48, see also FIGS. 5, 6 and 7 is a commercially available hammer mill designed for the purpose of milling dry, free flowing materials in which, however, the cage plate has been exchanged for a purpose-built shredding screen 53 as illustrated in FIG. 7. The hammer mill 48 has a hollow housing 60 in which a series of parallel, circular plates 56 are received within a cutting/shredding chamber 61. Plates 56 are fixed against rotation on a common axle 57 which is driven by an electro-motor 62 through a transmission belt in known manner. Each plate 56 (only one per plate shown) carries a number of strip-like hammers 59 that are equidistantly spaced about the circumference of the respective plate 56 and are pivotally fixed thereto by way of pins 58. Within housing 60 is arranged the semi-circular shredding screen 53, comprised of a thin (6 mm), rectangular steel plate 54 containing numerous openings 55 extending through the plate and which are longitudinal in circumferential extension of the plate 54, either rectangular or oblong in shape. The dimensions of openings 55 may be chosen according to the size requirements of the end product. The distance between openings 55, both laterally and longitudinally, should be as small as possible, preferably not more than 6 mm. Screen 53 is positioned below but close to the terminal ends of said hammers 59.

As continuous extrudate material is fed through an inlet chute 50 which is made integral with a housing hood 51 into shredding chamber 61, it is not only subjected to a cutting/shredding action between the hammers themselves, as the discs and attached hammers are spun at a rotational speed of between 1500 and 2500 rpm, but also between the hammers and the edges defined at the oblong or slit-like openings 55 in screen plate 54. During the shredding process, the hammers break up the extrudate ribbon or slab and push the resulting smaller, shredded pieces through screen 53 and discharge chute 52 into a container vessel or another transport conveyor 62, as schematically illustrated in FIG. 1.

The cutting/shredding speed (i.e. rpm of the disks 56) can be adjusted and screens 53 having different numbers and sizes of elongate discharge/shredding openings 55 can be used to obtain a shredded end product of different shred sizes. Preferably, all openings 55 have the same size, so as to obtain a random appearance of the shredded product in which individual shreds have a more or less similar weight.

The above described line 10 is especially adapted for the manufacture of shredded meat analogue product. The shredded end product is to have a dense, fibrous, structure that resembles not only in appearance but also in texture, bite and feel of flaked or shredded meat such as, tuna fish or chicken breast meat. Such product will typically have the nutritional constitution indicated in Table 1.

TABLE 1

| Constituent | % by weight |
| --- | --- |
| Protein | 25–35 |
| Fat | 0–10 |
| Carbohydrate | 5–20 |
| Moisture | 40–60 |
| Ash | 0–5 |

Suitable ingredients that can used to prepare such a product contain high amounts of plant protein, with possible addition of or substitution of a small portion of the plant protein with animal protein such as fish or animal meat, or meat by-products, or other protein sources. Suitable materials generally used as a source of protein include soybeans, wheat, corn and eggs. Materials such as cellulose or sugar beet pulp are used as additional sources of dietary fibre. Red meat and/or meat by-products may also be added. Small quantities of vitamins, minerals, colourings and flavourings are also usually included in the product to provide the correct nutritional profile, colour and palatability.

A typical product formulation may include the ingredients listed in Table 2, whereby the weight % provides approximate values of relative composition of the finished mixture.

TABLE 2

| Ingredient | % Weight |
| --- | --- |
| defatted soy flour | 40–55 |
| Vital wheat gluten | 35–45 |
| Nutritional Cellulose | 0–5 |
| Vitamins | 0.1–0.3 |
| Minerals | 0.1–7.0 |
| Sulphur | 0.08–0.3% |
| Flavourings | 0–3.0 |
| Colourings | 0.01–3.0 |

The mineral components typically include cross-linking agents to enhance texturisation/fibration of the proteins during the extrusion and subsequent cooling process, stable mineral compounds which do not leach out from the extrudate and stay in matrix with the protein and fibre components during subsequent process treatment, (e.g. in food pasteurisation and canning procedures) as well as nutritional mineral supplements.

Some of the ingredients listed in Table 2 may be substituted with other ingredients having similar properties. For example, Table 3 lists substituents that have been successfully tested in the manufacture of a shredded TPP that satisfies the above mentioned criteria and desired characteristics in relation to mimicking tuna fish flakes.

TABLE 3

| Ingredient | Substituent |
| --- | --- |
| Defatted soy flour | soy meal |
| Defatted soy flour | soy concentrate |
| Vital wheat gluten | egg white powder |
| Vital wheat gluten | Vital wheat gluten/maize gluten |
| Vital wheat gluten | Vital wheat gluten/wheat flour |

The substituents listed above are generally preferred, although the object of the invention may still be achieved by using other functional, high protein sources (eg. cereal or meat fractions).

EXAMPLE 1

A manufacturing process, using production line 10, for a desired meat analogue product using ingredients listed in Table 2 will now be described.

The ingredients are pre-blended in a weight range as indicated in Table 2 in ribbon blender 18 and metered into extruder 22 using mass dry material hopper 20. The moisture content of the dry ingredient blend is typically in the range 9–14% by weight. Water is metered into the first or second section of the extruder barrel through injection port 26. Steam may also be used, metered into the extruder's second or third barrel section.

Figure 2:
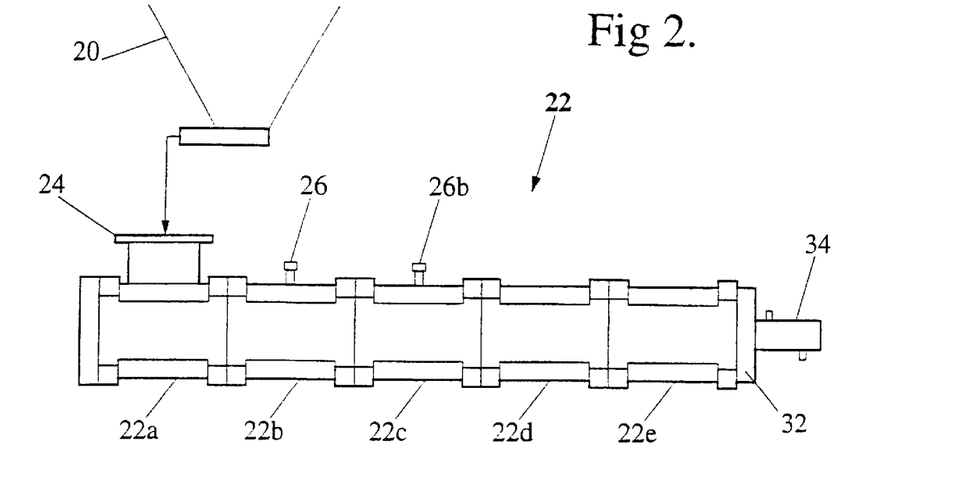
FIG. 2 is a schematic side representation of the extrusion device illustrated in block form in FIG. 1.

The extruder screw(s) convey the moistened mixture toward the outlet at the last extruder barrel 22e, the mixture being hereby subjected to increasing shear and pressure. Temperature in the barrel sections is generally set between 60–140° C., the higher temperatures being present at the middle barrel sections where plastification and "melting" of the dry precursor materials is mostly effected, whereas pressure within the extruder barrels attains levels generally between 3–8 MPa, depending on whether a barrel section contains paddles or screw flights intended primarily to convey the mixture towards the extruder outlet or mainly impart shear to the plastifying mixture and therefore increase back pressure. The screw speed is normally set at between 200–350 rpm.

The hot, viscous proteinaceous lava created from the dry materials and water is pressed through the holes of breaker plate 33 (also called a primary die plate) which is situated downstream of the last conveying flight or paddle of the extruder screws.

After flowing through primary die plate 33, the hot extrudate mass flows through transition piece 35 into cooling die 34. The primary function of the cooling die is to prevent the extrudate being subject to vapour flashing and uncontrolled expansion (puffing) by physically constraining the extrudate in the die and cooling the extrudate to decrease water vapour pressure to about ambient conditions. The cooling die promotes formation of a dense, fibrous texture that is an important attribute of the product. For further details on the precise mechanics of texturisation of proteinaceous materials, reference should be had to the literature mentioned in the introductory part of the description.

Upon leaving cooling die 34, the continuous, slab or band-like extrudate product is sufficiently cool that it does not expand significantly and therefore has a relatively dense, fibrous texture. Typically, the product has at that stage a moisture content of about 40–60% by weight and is relatively tough-elastic. Product density will normally be between 0.85 and 1.05 kg/l.

The extruded product is conveyed by transport conveyor 42 from the cooling die outlet directly to cutting/shredding device 48, whilst being subjected to water mist spraying to enhance surface solidification of the product prior to the shredding operation, without further substantial cooling of the extrudate.

The continuous band of extrudate product enters hammer mill 48 through chute 50 at the top of the unit and is broken up by the spinning hammers 59 and made to pass through the slit-like or oblong openings of screen 53 located below said hammers. Shredded TPP is discharged through chute 52 onto conveyor 62 or any other suitable vessel.

After shredding, the product is ready for further use or processing. It may be used immediately, or frozen for use at a later stage. When used as a meat extender in pet food products, the shredded product would be mixed with fish, chicken or other meats as well as vitamins, minerals, gelling agents and gravy before being filled into cans, trays or other containers, and then subjected to appropriate thermal treatments to obtain an end product that is ready for consumption.

The shredded product, when mingled with real meat pieces (eg fish pieces) and gravy, has an appearance very similar to shredded meat chunks (eg fish chunks).

The shredded TPP can contain precursor materials which impart to the finished product a colour and taste very similar to that of the desired meat product which is mimicked by the analogue product (e.g. tuna, salmon, chicken, beef or lamb). However, the formulation of precursor materials can be varied as indicated above within a narrow range, and in particular flavouring agents in the form of additional meats and fats can be incorporated. These meats and fats may include fish meat, fish oil, chicken meat, chicken fat, beef, lamb or fats obtained from such meats. Thereby it is possible to obtain a shredded product that resembles and tastes like shredded fish meat, shredded chicken meat etc.

EXAMPLE 2

A specific example of a meat analogue product manufactured in accordance with the invention and the process parameters used during its manufacture are provided below.

Meat analogue chunk having a fibrous striated structural matrix and resembling tuna white meat was prepared using the method and apparatus generally described above as follows:

The ingredients listed in Table 4 were weighed out as indicated there, milled through a hammer mill fitted with a screen of size 1.2–2 mm and pre-blended in a ribbon blender for 4 minutes.

TABLE 4

| Ingredient | % by weight |
| --- | --- |
| Defatted soy flour | 51.5 |
| Vital wheat gluten | 42 |
| Di-calcium phosphate | 5 |
| Vitamins | 0.18 |
| Minerals | 0.2 |
| Sulphur | 0.1 |
| Flavouring agents | 1.0 |
| Colouring agents | 0.02 |

The blended mixture was then fed into the hopper and metered into the extruder (Werner & Pfleiderer C58, fitted with 5 barrel sections) at a rate of 40 kg/hr. Water was added at the barrel section adjacent to the feed section at a rate of 32 kg/hr. The extruder screw rpm was set at 250. Temperatures of the barrels were regulated to the values listed in Table 5.

TABLE 5

| Barrel number | Temp ° C. |
| --- | --- |
| 1 | 25 |
| 2 | 95–105 |
| 3 | 105–115 |
| 4 | 105–115 |
| 5 | 95–105 |

The dry precursor materials and water are plasticised and molten into a viscous extrudate as they are conveyed through the extruder barrel sections. The hot melt is extruded through the breaker plate (20 holes with a diameter of 3.5 mm and land length of 10 mm). The extrudate leaving the breaker plate enters the cooling die channel member (cross-sectional dimensions of 50 mm by 7 mm and a length of 400 mm), cooling water inlet temperature being set at about 5° C.

Extrudate product exiting the cooling die as a continuous slab was analysed and shown to have a moisture level of 48–52% by weight and a density in a range between 0.95–1.05 kg/l. The slab was then conveyed directly to the modified hammer mill under water spraying at a temperature of about 15° C. The product slab was cut and shredded into pieces of torn, non-uniform appearance, quite similar to canned white tuna pieces. The rotational speed of the hammer discs was set to 1800–2000 rpm, whilst a screen with holes of a size of 50 mm by 7 mm was employed.

EXAMPLE 3

Meat analogue chunk having a fibrous striated structural matrix and resembling beef muscle meat was prepared using the method and apparatus generally described above as follows:

The ingredients listed in Table 6 were weighed out as indicated there, milled through a hammer mill fitted with a screen of size 1.2–2 mm and pre-blended in a ribbon blender for 4 minutes.

TABLE 6

| Ingredient | % by weight |
| --- | --- |
| Vital wheat gluten | 42 |
| Soy concentrate | 41.6 |
| Fibre | 10.0 |
| Di-calcium phosphate | 5 |
| Colouring agents | 0.6 |
| Salt | 0.5 |
| Vitamins | 0.2 |
| Sulphur | 0.1 |

The blended mixture was then fed into the hopper and metered into the extruder (Werner & Pfleiderer C58, fitted with 5 barrel sections) at a rate of 40 kg/hr. Emulsified beef liver was added at the barrel section adjacent to the feed section at a rate of 50 kg/hr. The extruder screw rpm set at 280. Temperatures of the barrels were regulated to the values listed in Table 7.

TABLE 7

| Barrel number | Temp ° C. |
| --- | --- |
| 1 | 25 |
| 2 | 95–105 |
| 3 | 125–135 |

TABLE 7-continued

| Barrel number | Temp ° C. |
|---|---|
| 4 | 130–140 |
| 5 | 125–135 |

The dry precursor materials and meat are plasticised and molten into a viscous extrudate as they are conveyed through the extruder barrel sections. The hot melt is extruded through the breaker plate (20 holes with a diameter of 3.5 mm and land length of 10 mm). The extrudate leaving the breaker plate enters the cooling die channel member (cross-sectional dimensions of 50 mm by 7 mm and a length of 400 mm), cooling water inlet temperature being set at about 5° C.

Extrudate product exiting the cooling die as a continuous slab was analysed and shown to have a moisture level of 48–52% by weight and a density in a range between 0.90–1.1 kg/l. The slab was then conveyed directly to the modified hammer mill under water spraying at a temperature of about 15° C. The product slab was cut and shredded into pieces of torn, non-uniform appearance, quite similar to canned white tuna pieces. The rotational speed of the hammer discs was set to 1800–200 rpm, whilst a screen with holes of a size of 50 mm by 7 mm was employed.

The claims defining the invention are as follows:

1. A method of manufacturing a texturised proteinaceous meat analogue product, comprising the steps of:
   subjecting, in a food extruder, a mixture containing: about 40 to 95% by weight edible proteinaceous materials selected from the group consisting of predetermined mixtures of defatted soy flour, soy meal, soy concentrate, cereal gluten in vital or starch-containing form and egg white, and up to about 7% by weight of edible mineral binding and cross-linking compounds;
   to mechanical pressure and added heat sufficient to convert the mixture into a hot, viscous protein lava;
   extruding the protein lava through and from a temperature controlled cooling die which cools and reduces the viscosity of the protein lava to obtain a cohesive, texturised, extrudate slab or ribbon in which vapour-flashing is substantially inhibited; and
   subjecting the solidified extrudate slab or ribbon to mechanical shredding in a hammer mill having a cage plate with a plurality of elongate discharge openings and a plurality of hammer bars hinged to discs attached to a rotating shaft, so as to obtain a plurality of extrudate shreds that resemble in consistency and texture flaked or shredded meat.

2. A method in accordance with claim 1, wherein meat or a meat by-product is added to the mixture.

3. A method in accordance with claim 1, wherein meat or a meat by-product is added during the extrusion step.

4. A method in accordance with claim 1, wherein the extrudate slab or ribbon is transferred directly after leaving the cooling die to the hammer mill for shredding.

5. A method in accordance with claim 1, wherein the mixture which is subjected to mechanical pressure and heat in the food extruder has a total moisture content of about 40 to 60%.

6. A method in accordance with claim 5, wherein water in an appropriate amount is added to the mixture itself, or into the extruder at a point downstream of the feeding entry for dry material mixture, so as to obtain a total moisture content of the extrudate slab or ribbon within a range of about 40 to 60%.

7. A method in accordance with claim 1, wherein water is sprayed onto the extrudate slab or ribbon after exiting the cooling die and whilst being conveyed towards the hammer mill, so as to obtain a total moisture content of the extrudate slab or ribbon within a range of about 40 to 60%.

8. A method in accordance with claim 1, wherein the mixture contains 75 to 95% by weight edible proteinaceous materials.

9. A method in accordance with claim 1, wherein the mixture comprises, in percent (%) by weight of mixture materials, of:
   about 40–55% defatted soy flour, soy meal or soy concentrate;
   about 35–45% vital wheat gluten, egg white powder, a mixture of vital wheat gluten and maize gluten or a mixture of vital wheat gluten and wheat flour;
   01.1–7.0% of non-leaching mineral compounds including such that bind the protein matrix and enhance protein cross-linking;
   optionally, 0–5% nutritional fibre additives, in particular cellulose or beet pulp;
   0.1–0.3% vitamins;
   0–3.0% flavouring agents; and
   0.01–3.0% colouring agents.

10. A method in accordance with claim 1 or 9, wherein the mixture comprises, in percent (%) by weight of mixture materials, of about 51.5% defatted soy flour, about 42% vital wheat gluten, about 5% dicalcium phosphate, about 0.1% sulphur, about 0.18% nutritional vitamin supplements, about 0.2% nutritional mineral supplements, about 1.0% flavouring agents and about 0:002% colouring agents.

11. A method in accordance with claim 1, wherein the mixture comprises, in percent by weight, of about 41.6% soy concentrate, 42% vital wheat gluten, 10% fibre, 5% di-calcium phosphate, 0.6% colouring agents, 0.5% salt, 0.2% vitamins and 0.1% sulphur.

12. A method in accordance with claim 1, wherein the extrudate shreds, subsequent to the shredding operation, undergo further processing selected from the group consisting of freezing, dehydration and/or co-mingling with food products for subsequent packaging.

13. A production line for the manufacture of texturised proteinaceous meat analogue products, according to the method of claim 1, the production line comprising:
   a food extruder with a plurality of temperature-controlled barrel sections at least one feed opening adapted for receiving the mixture of claim 1 and a discharge opening arranged for discharging a hot, viscous protein lava;
   a temperature-controlled cooling die located at the discharge opening and arranged for receiving the hot protein lava and cooling the same to such an extent that an at least surface-solidified, proteinaceous extrudate slab or ribbon exits the cooling die substantially without vapour flashing taking place in the extrudate;
   a hammer mill having a cage plate with a plurality of elongate discharge openings and a plurality of hammer bars hinged to discs attached to a rotating shaft; and
   conveyor means arranged to receive and convey the extrudate slab or ribbon from the cooling die to a feeding chute of the hammer mill.

14. A production line according to claim 13, wherein the cage plate openings of the hammer mill are of substantially uniform rectangular shape and area.

15. A production line according to claim 13 or claim 14, wherein the cage plate is bent into a semi-circular shape, and wherein the rectangular or oblong openings extend with their longer sides in circumferential extension of the plate.

16. A production line according to claim 13, wherein the distance between openings, both laterally and longitudinally, is not more than 6 mm.

17. A production line according to claim 13, wherein the cage plate is positioned below but close to the terminal free ends of the hammers, whereby continuous extrudate material being fed into the cutting/shredding chamber in which the disc-supported hammers are located is subjected to a cutting/shredding action not only between the hammers themselves during rotation of the discs, but also between the hammers and the edges defined at the oblong or rectangular openings of the cage plate.

18. A production line according to claim 13, wherein the conveyor means includes an endless conveyor rack extending between an outlet of the cooling die and an inlet chute of the hammer mill.

19. A production line according to claim 13, further including a water spraying unit associated with the conveyor means and incorporating a plurality of water spraying nozzles arranged to direct fine sprays of water on to the surface of the extrudate ribbon as it travels on the transport conveyor.

20. A production line according to claim 13, wherein the production line is incorporated in a canned pet food manufacturing line in which a shredded extrudate obtained in the hammer mill is discharged onto a further conveyor means, said further conveyor means adapted for conveying the shredded extrudate towards a mixing unit where the shredded extrudate is co-mingled with real meat products and subsequently filled into cans in a canning station.

21. A meat analogue product manufactured in accordance with the method described in claim 1.

22. The method of using a hammer mill in the production of a texturised proteinaceous meat analogue product according to the method of claim 1, wherein the hammer mill incorporates the features referred in claim 13.

* * * * *